(12) United States Patent
Chiu et al.

(10) Patent No.: US 7,560,314 B2
(45) Date of Patent: Jul. 14, 2009

(54) METHOD OF FABRICATING AN ACTIVE ARRAY COLOR FILTER STRUCTURE FOR A LIQUID CRYSTAL DISPLAY

(75) Inventors: Wan-Wen Chiu, Hsinchu (TW);
Chao-Kai Cheng, Hsinchu (TW);
Yuh-Zheng Lee, Hsinchu (TW);
Fu-Kang Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 373 days.

(21) Appl. No.: 11/401,311

(22) Filed: Apr. 11, 2006

(65) Prior Publication Data
US 2007/0268421 A1    Nov. 22, 2007

(30) Foreign Application Priority Data
Dec. 29, 2005    (TW) ............................... 94147324 A

(51) Int. Cl.
*H01L 21/00*    (2006.01)
*H01L 21/84*    (2006.01)
(52) U.S. Cl. ..................... 438/149; 257/59; 257/72; 349/42

(58) Field of Classification Search .................. 257/59, 257/72, 98; 438/22, 28, 149
See application file for complete search history.

(56) References Cited

U.S. PATENT DOCUMENTS

| | | | |
|---|---|---|---|
| 5,739,946 A * | 4/1998 | Iwanaga et al. ............. 359/296 |
| 2002/0054252 A1* | 5/2002 | Ishii et al. .................. 349/106 |
| 2002/0054965 A1* | 5/2002 | Ogawa ...................... 428/1.23 |
| 2007/0093002 A1* | 4/2007 | Maekawa et al. ........... 438/149 |

* cited by examiner

*Primary Examiner*—Jerome Jackson, Jr.
*Assistant Examiner*—Anthony Ho
(74) *Attorney, Agent, or Firm*—Rabin & Berdo, P.C.

(57) ABSTRACT

A method of fabricating an active array color filter structure utilizes the difference between the surface properties of lipophilicity and lipophobicity. When inks are coated on an active array substrate, ink at the lipophobic areas on the active array substrate will be repelled naturally, so that the color filter pixels formed on the active array substrate naturally have contact vias, which facilitates the electrical coupling of pixel electrodes and switch elements. Since there is no aligning or laminating process required for the color filter substrate and the active array substrate during fabrication, no aligning errors will occur. Also, because the pixel electrode can extend to cover over the corresponding switch element, aggravation of the switch element is reduced.

20 Claims, 20 Drawing Sheets

METHOD OF FABRICATING AN ACTIVE ARRAY COLOR FILTER STRUCTURE FOR A LIQUID CRYSTAL DISPLAY

CROSS-REFERENCE TO RELATED APPLICATIONS

This non-provisional application claims priority under 35 U.S.C. § 119(a) on Patent Application No(s). 094147324 filed in Taiwan, R.O.C. on Dec. 29, 2005, the entire contents of which are hereby incorporated by reference.

BACKGROUND OF THE INVENTION

1. Field of Invention

The present invention relates to a liquid crystal display (LCD), and more particularly to an active array color filter structure and a fabricating method therefor.

2. Related Art

In recent years, various kinds of flat panel displays have been developed, such as the liquid crystal display (LCD), plasma display panel (PDP), field emission display (FED), and electro-luminescence display (ELD). Among these flat panel displays, the LCD has the advantages of high resolution, being light in weight, compact in size, and low in driving voltage, thus it is widely applied in various information, communication, and consumer electronic products emphasizing portability.

Generally speaking, an LCD has two separated and opposite substrates, with a liquid crystal material sandwiched there-between. The two substrates have opposite electrodes. When voltages are applied to the electrodes, an electric field will be generated to penetrate the liquid crystal material. Here, in the liquid crystal material, the alignment of liquid crystal molecules is changed to the direction of the induced electric field according to the intensity of the induced electric field, thereby altering the light transmission of the LCD. Therefore, the LCD displays images by altering the intensity of the induced electric field.

In the manufacturing process, after the color filter substrate and the active array substrate are laminated together, the liquid crystal material is filled there-between. When being laminated, the two substrates must be aligned with each other accurately, and a fixed cell gap thickness must be maintained. Therefore, the aligning and laminating process is usually the step with the lowest yields in the whole process for manufacturing the LCD.

Currently, the LCD tends to have a large size, high luminance, and high resolution. However, when the resolution is increased, the error space will be narrowed, so that the laminating accuracy of the color filter substrate and the active array substrate will be reduced, and the aperture ratio will also be lowered, directly influencing the luminance of the LCD. When the error is increased to meet the requirement of having a large size, the yield of laminating of the color filter substrate and the active array substrate will be reduced.

Referring to FIG. 1, it is a perspective view of a conventional LCD. As shown in FIG. 1, a LCD 100 includes a color filter substrate 120, an active array substrate 140, and a liquid crystal material 160. Here, the color filter substrate 120 is used for displaying colors, and is disposed on the opposite side of the active array substrate 140 and has color filter structures 122, black matrixes 124, and common electrodes 126. The black matrix 124 is disposed between the color filter structures 122. The common electrode 126 has the color filter structures 122 and black matrixes 124 there-on. The active array substrate 140 includes data lines 142, gate lines 144, pixel electrodes 146, and thin film transistors (TFT) T. The data line 142 and the gate line 144 are interleaved with each other to form a pixel region P, where the pixel electrode 146 and the TFT T are disposed. The TFT T is disposed near the intersection of the data line 142 and the gate line 144, and is arranged on the active array substrate 140 into a matrix. It is used as a switch element, to control the switching actions of the pixel electrode 146. Also, a storage electrode 148 and the gate line 144 are overlapped, to form a storage capacitor.

The data line is connected with the source of the TFT, and the gate line is connected with the gate of the TFT. When a scan signal is input to the gate line, and a voltage is applied to the gate of the TFT, the TFT is ON. At this time, the signal line inputs charges from the source of the TFT to the drain of the TFT, so that the voltage is applied to the pixel electrode. Subsequently, the gate line returns to the original state, so that the TFT is OFF. Then, next gate line is turned into the ON state, and the driving operation of the next stage will be repeated continuously.

However, the conventional active array substrate has a problem in that the properties of the TFT change sharply over time. That is, when a voltage is applied to the TFT, the problem of the changing of properties will occur after a time period, which is called the off-characteristic of the transistor. Due to the aggravation of the transistor, the lifetime of the substrate is reduced.

SUMMARY OF THE INVENTION

In view of the above problems, it is an object of the present invention to provide an active array color filter structure and a fabricating method therefor, to solve the problems in the prior art, such as difficulties in accurately aligning and laminating the substrate, and the aggravation of the transistor.

It is another object of the present invention is to provide an active array color filter structure and a fabricating method therefor, to simplify the fabricating procedures and reduce the frequency of using exposure and development processes, so as to reduce fabricating cost and equipment costs, and thereby enhancing the competitiveness of the product.

It is another object of the present invention is to reduce the aggravation of the switch element, so as to elongate the lifetime of the substrate, improve product reliability, and achieve a high-quality displaying effect.

It is still another object of the present invention is to prevent light leakage for the switch element, so as to replace the black matrix with the function of preventing light leakage.

According to one aspect of the invention, a method for fabricating the active array color filter structure disclosed in the present invention includes the following steps: providing an active array substrate, wherein the active array substrate has a plurality of switch elements; performing a surface treatment to form a plurality of lipophobic areas on the active array substrate; coating at least one ink on the active array substrate to form a plurality of color filter pixels, wherein each of the color filter pixels has at least one contact via corresponding to the lipophobic area; and forming a plurality of pixel electrodes on the color filter pixels, wherein the pixel electrode is electrically coupled with the corresponding switch element through the contact via.

According to another aspect of the invention, an active array color filter structure is provided, which includes an active array substrate, a plurality of color filter pixels, and a plurality of pixel electrodes. The active array substrate comprises a plurality of switch elements arranged into a matrix. The color filter pixels are respectively located on the active array substrate corresponding to the switch elements, and each of the color filter pixels has at least one contact via. In addition, the plurality of pixel electrodes are respectively disposed on the color filter pixels and electrically coupled with the corresponding switch elements through the contact via.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow for illustration only, and which thus is not limitative of the present invention, and wherein.

DETAILED DESCRIPTION OF THE INVENTION

Figure 1:
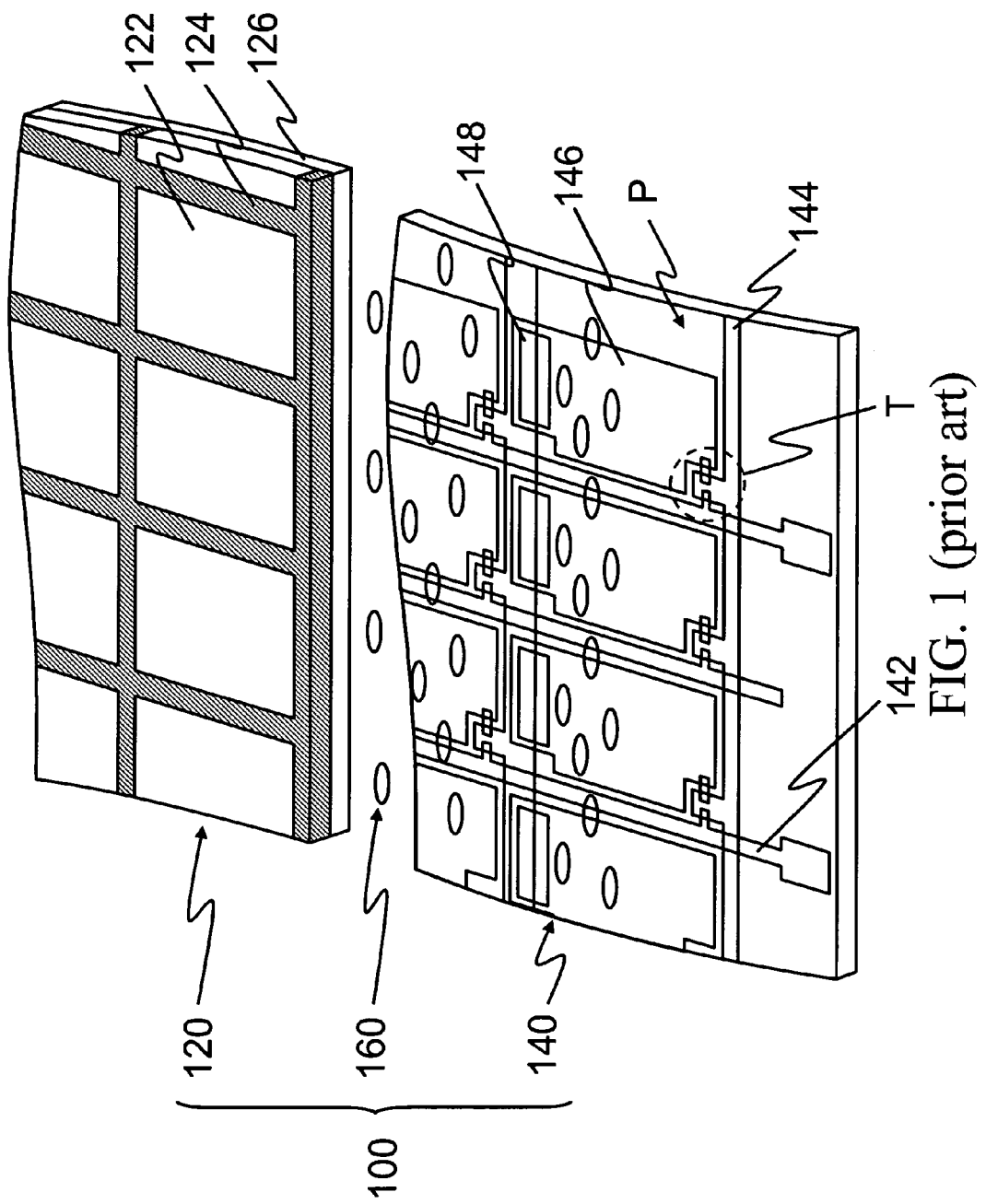
FIG. 1 is a stereogram of the outline of a conventional LCD.

The content of the present invention is illustrated below in details through specific embodiments with reference to the accompanying drawings. The reference numerals mentioned in the illustration refer to the corresponding numerals in the drawings.

Figure 2A:
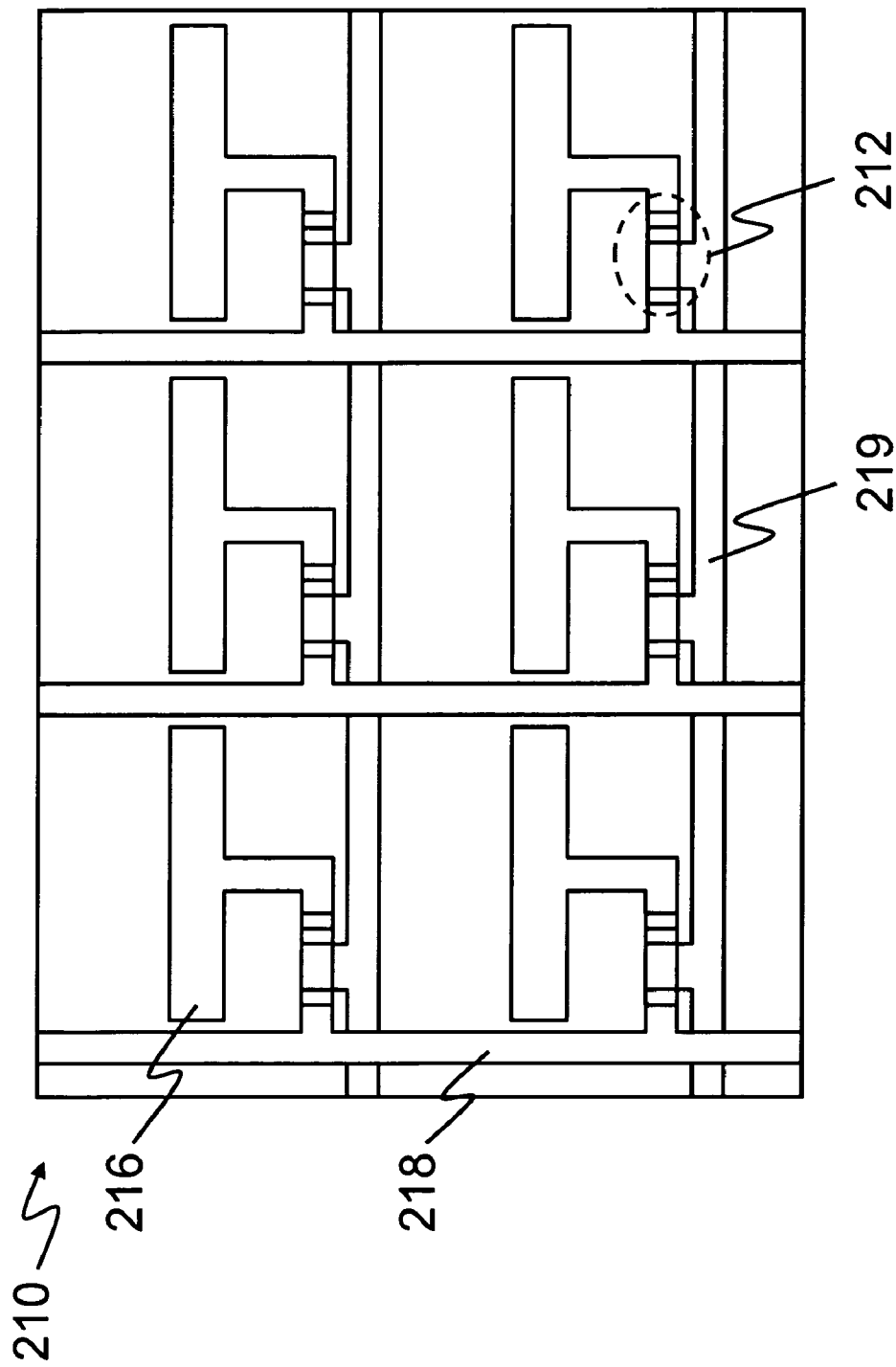
FIGS. 2A to 2D are flow charts of a method for fabricating an active array color filter structure according to the first embodiment of the present invention.
Figure 2B:
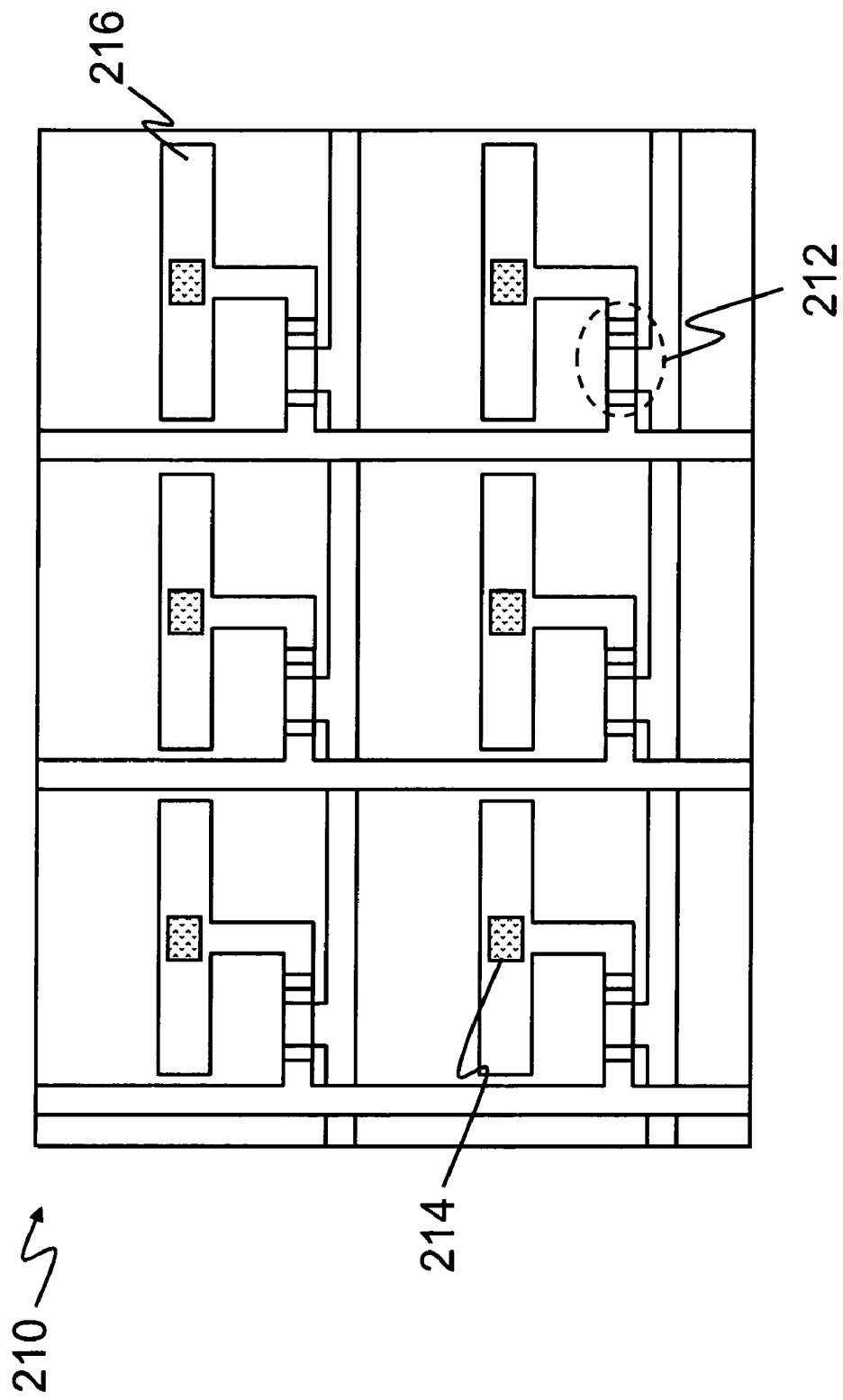
Figure 2C:
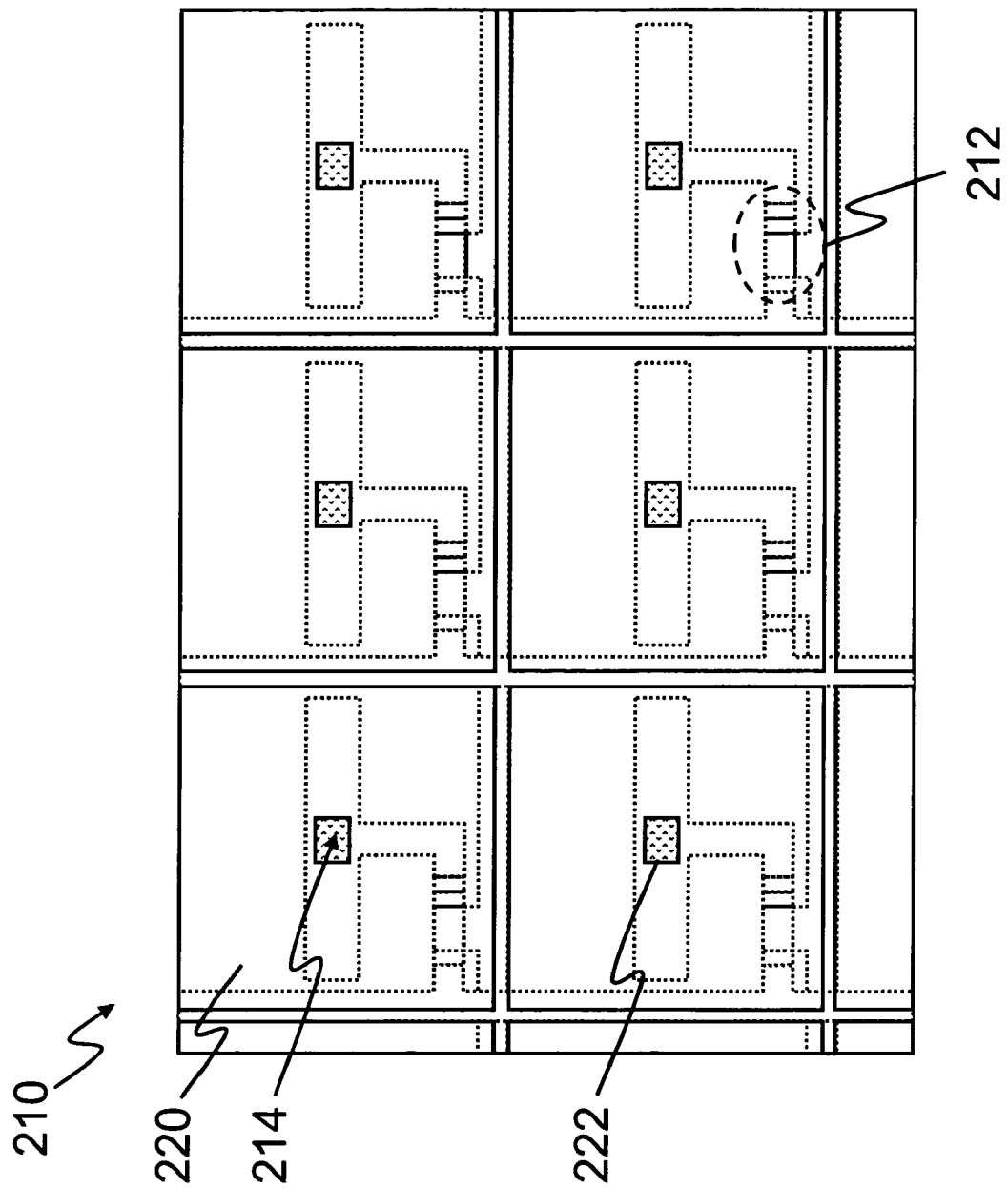
Figure 2D:
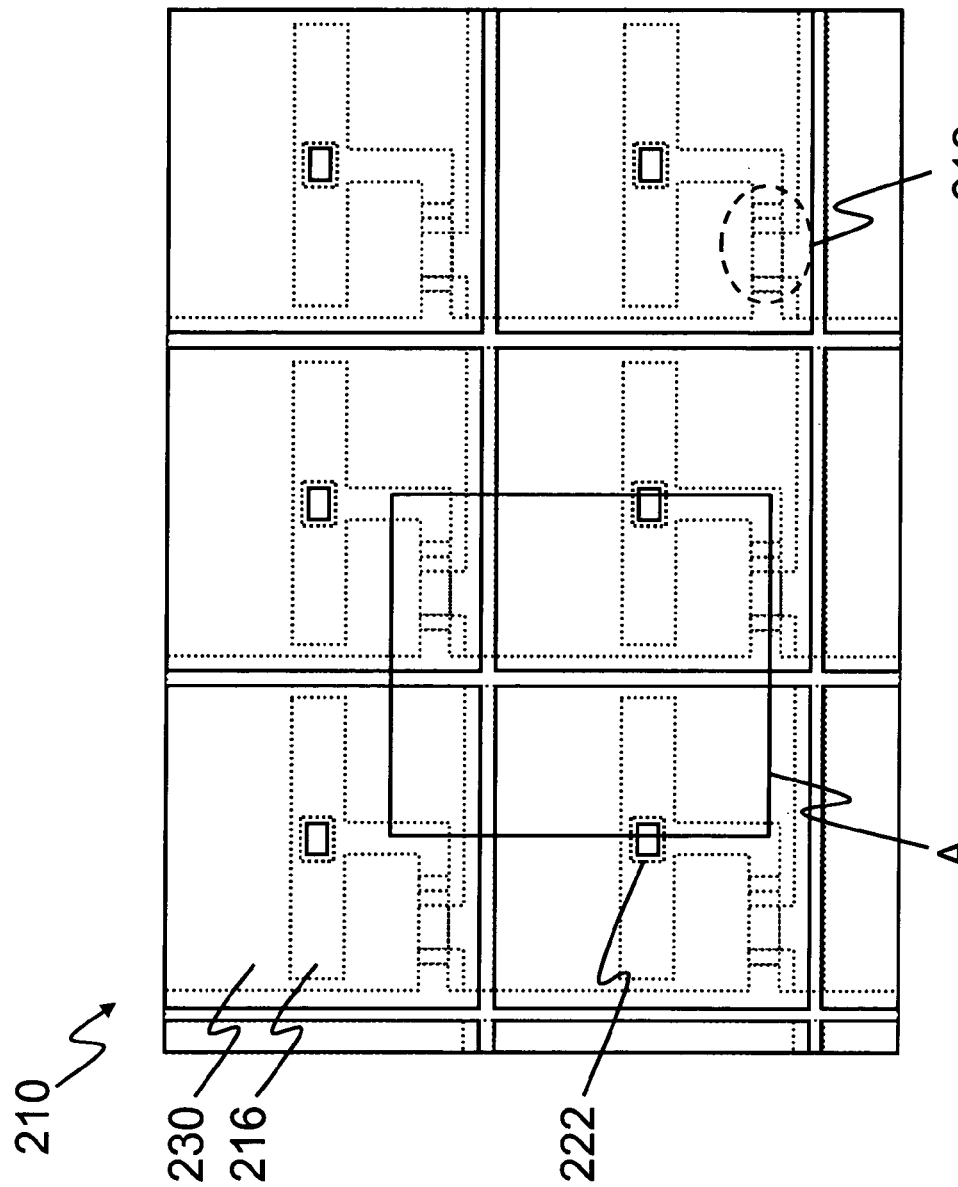
Figure 3:
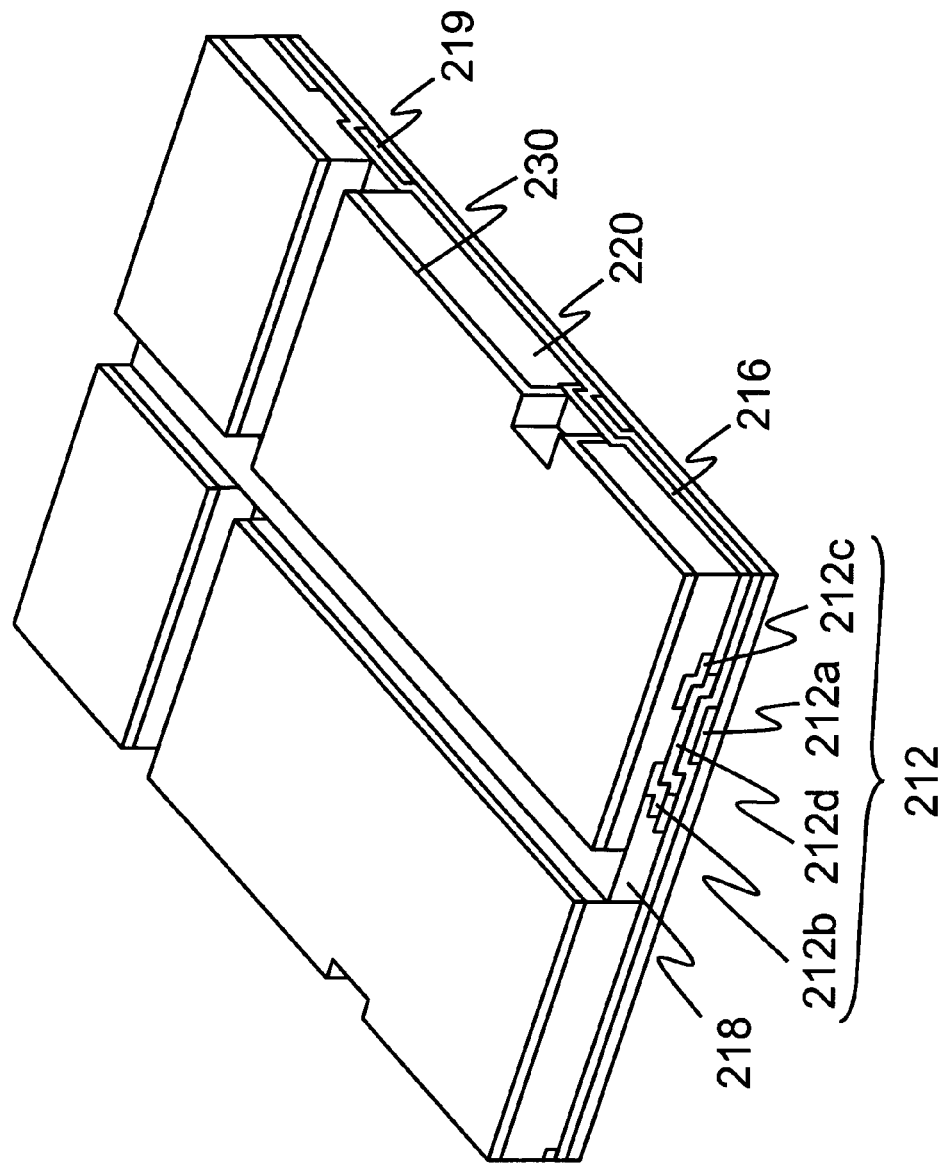
FIG. 3 is an enlarged stereogram of the part A of the active array color filter structure in FIG. 2D.

Please refer to FIGS. 2A, 2B, 2C, 2D, and 3. FIGS. 2A to 2D show a method for fabricating an active array color filter structure according to one embodiment of the present invention. FIG. 3 is an enlarged stereogram of the part A of the active array color filter structure in FIG. 2D.

An active array substrate 210 is provided and the active array substrate 210 has a plurality of switch elements 212 as shown in FIG. 2A; it further has transparent conductive layers 216 connected with the switch elements 212.

Next, a plurality of lipophobic areas 214 is formed on the active array substrate 210 through a surface treatment as shown in FIG. 2B. The lipophobic areas 214 are formed on the transparent conductive layer 216.

Next, red, green, and blue inks are coated on the active array substrate 210, so as to form a plurality of color filter pixels 220 on the active array substrate 210, as shown in FIG. 2C. When the inks are coated thereon, the inks on the lipophobic areas 214 will be naturally repelled due to the difference between the surface properties of lipophilicity and lipophobicity, so that a contact via 222 is naturally formed on the color filter pixels 220.

Then, pixel electrodes 230 are formed on the color filter pixels 220 and electrically coupled with the switch elements 212 below the color filter pixels 220 through the contact vias 222, as shown in FIGS. 2D and 3. In other words, the pixel electrode 230 is extended into the contact via 222, so as to cover the transparent conductive layer 216 exposed within the contact via 222, and the transparent conductive layer 216 is connected with the switch elements 212, thus, the switch elements 212 and the pixel electrode 230 are conducted via the transparent conductive layer 216. The pixel electrode may be extended to partly or completely cover the transparent conductive layer exposed within the contact via.

Thus, the conventional color filter substrate is combined with the active array substrate, and during fabrication, there is no aligning or laminating process for the color filter substrate and the active array substrate, so no aligning errors will occur, and the aperture ratio and the yield of the manufacturing process may be naturally increased. Particularly, when there is a requirement for a high-resolution specification, the effect that can be achieved here will be even more significant. Thus, this process can simplify the fabricating procedures and reduce the frequency of using exposure and development processes, in addition to increasing the aperture ratio and the yield of process, so as to reduce fabricating cost and equipment costs, and thereby enhancing the competitiveness of the product.

As for the lipophobic surface treatment, the lipophobic material is directly coated, such as by ink jet, or stamped at a position on the transparent conductive layer 216 where the contact via is intended to be formed, and thereby obtaining the lipophobic areas 214 shown in FIG. 2B.

However, if the lipophobicity of the coated lipophobic material is not sufficient, a plasma treatment can be further applied, so as to form the lipophobic areas 214 shown in FIG. 2B. The plasma treatment can be applied to the active array substrate with a fluorine-contained gas (such as $CF_4$, $SF_6$) or a gas mixed by a fluorine-contained gas and another gas not containing fluorine (such as $N_2$, $O_2$, Ar) in any suitable proportion. Thus, the transparent conductive layer 216 will have proper lipophobicity by adjusting the parameters such as gas concentration, pressure, and the applied energy. For example, the contact angle of the inks and the lipophobic material may reach over 60 degrees through a gas of $CF_4$ with the flow of 200 sccm and the energy of 75 W under a pressure of 1 Torr being processed for 60 seconds. Thus, after the inks are coated thereon, the inks on the lipophobic areas will be naturally repelled.

This lipophobic material may be a non-conductive lipophobic and hydrophilic material or a self-assembly monomolecular layer, e.g., a material with polar groups, such as poly (vinyl alcohol) (PVA) or poly (styrene sulfonic acid) (PSSA). Thus, after the fabrication of color filter pixels has been finished, the lipophobic material may be washed off with a polar solvent or water, and then the pixel electrode is fabricated. This lipophobic material also can be a conductive lipophobic material, such as poly (3, 4-ethylenedioxy thiophene) (PEDOT) or a solution of conductive metal nanoparticles. Thus, after the color filter pixels have been fabricated, the pixel electrode may be fabricated without needing to wash off the lipophobic material.

Figure 4A:
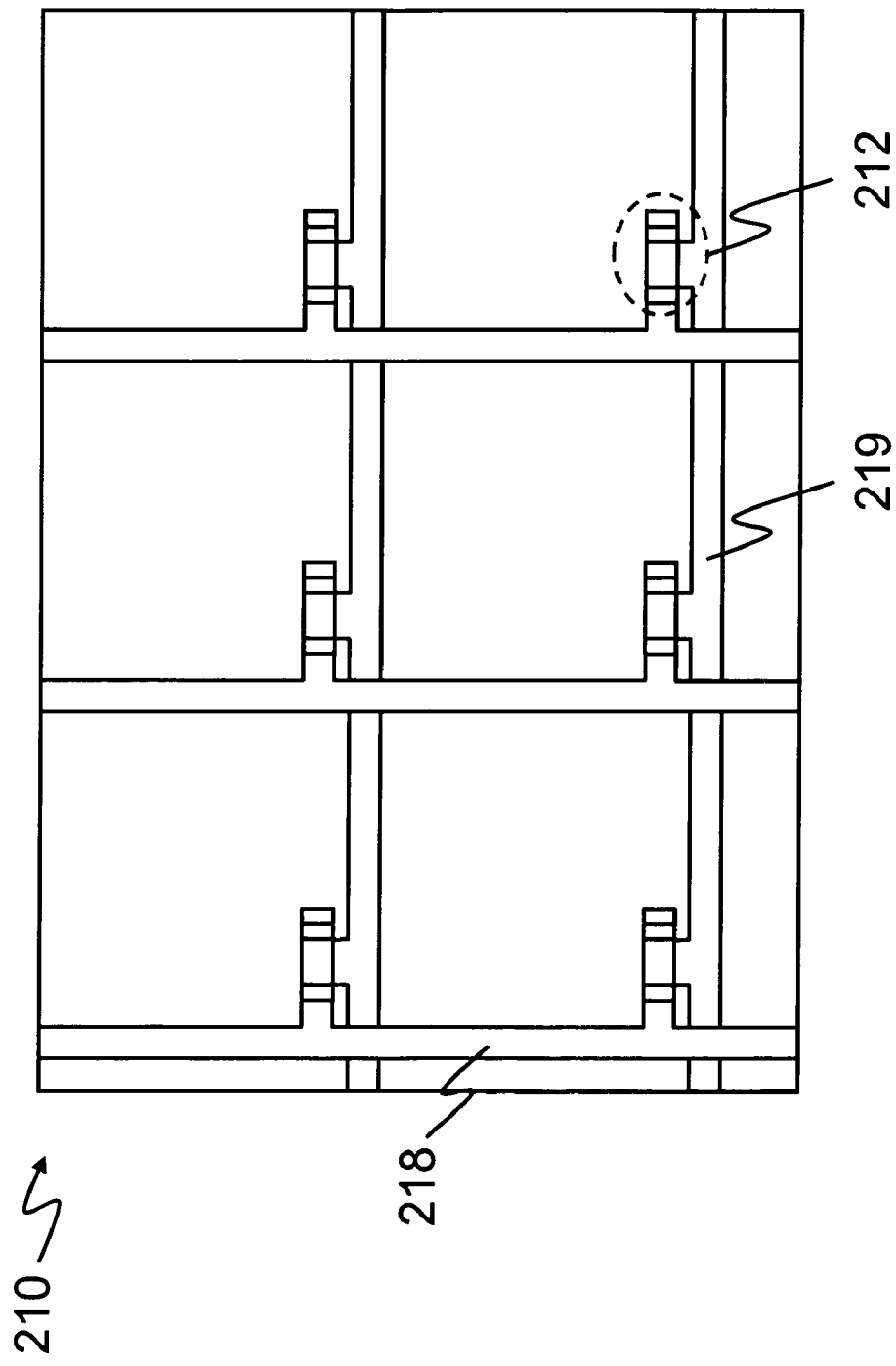
FIGS. 4A to 4D are flow charts of a method for fabricating an active array color filter structure according to the second embodiment of the present invention.

The active array substrate 210 comprises switch elements 212, data lines 218, and gate lines 219. The data lines 218 and the gate lines 219 are interleaved with each other to form pixel regions P. The switch element 212 is disposed in each pixel region P, as shown in FIGS. 2A and 4A. Referring to FIGS. 2A, 3 or referring to FIGS. 4A, 5, the switch element 212 is disposed near the intersection of the data line 218 and the gate line 219, and arranged on the active array substrate 210 into a matrix, which is used to control the switching actions of the pixel electrode 230. The color filter pixels 220 are overlapped with the pixel regions P.

The pixel electrode 230 may be extended to cover above the switch elements 212. Thus, the aggravation of the switch element may be reduced, so as to elongate the lifetime of the substrate, improve product reliability, and achieve a high-quality displaying effect.

Figure 6:
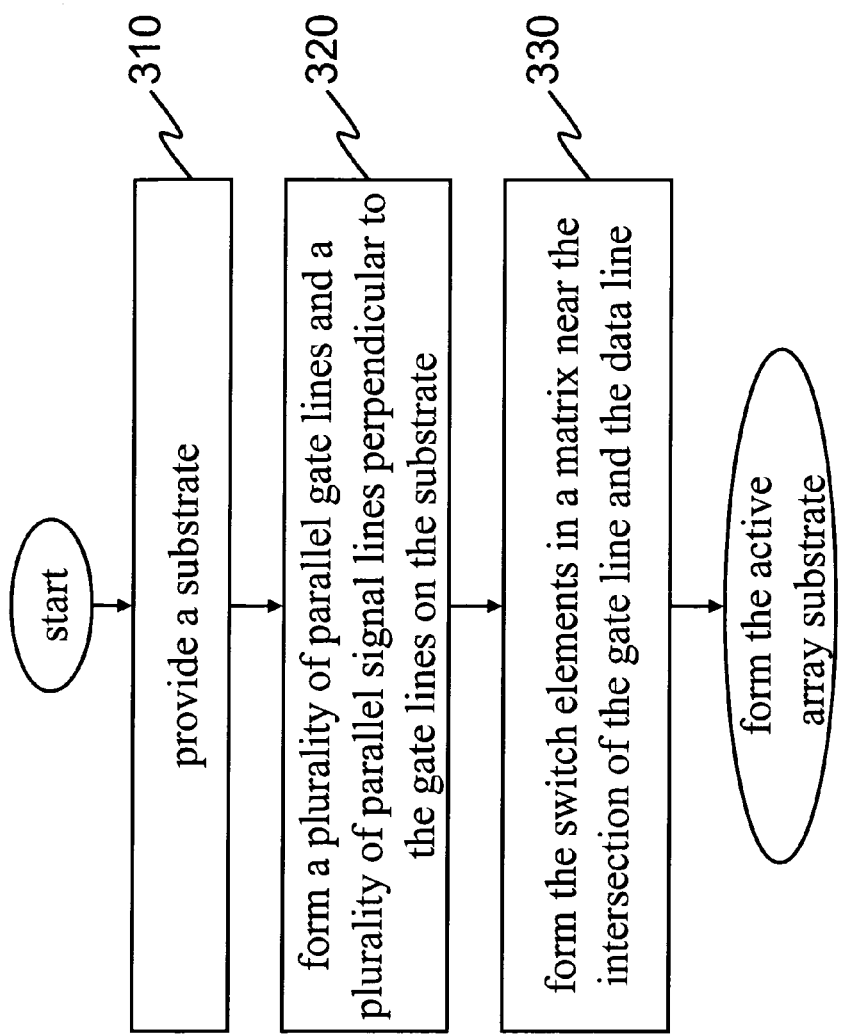
FIG. 6 is a flow chart for fabricating an active array substrate.

Then, referring to FIG. 6, a substrate is first provided (Step 310); next, a plurality of parallel gate lines and a plurality of parallel signal lines perpendicular to the gate lines are formed on the substrate, wherein the region between any two adjacent gate lines and any two adjacent data lines is a pixel region (Step 320); then, switch elements in a matrix are formed on the substrate near the intersections of the gate lines and the data lines (Step 330), thus forming the active array substrate. Here, the active array substrate may be formed with a plurality of mask processes.

Figure 5:
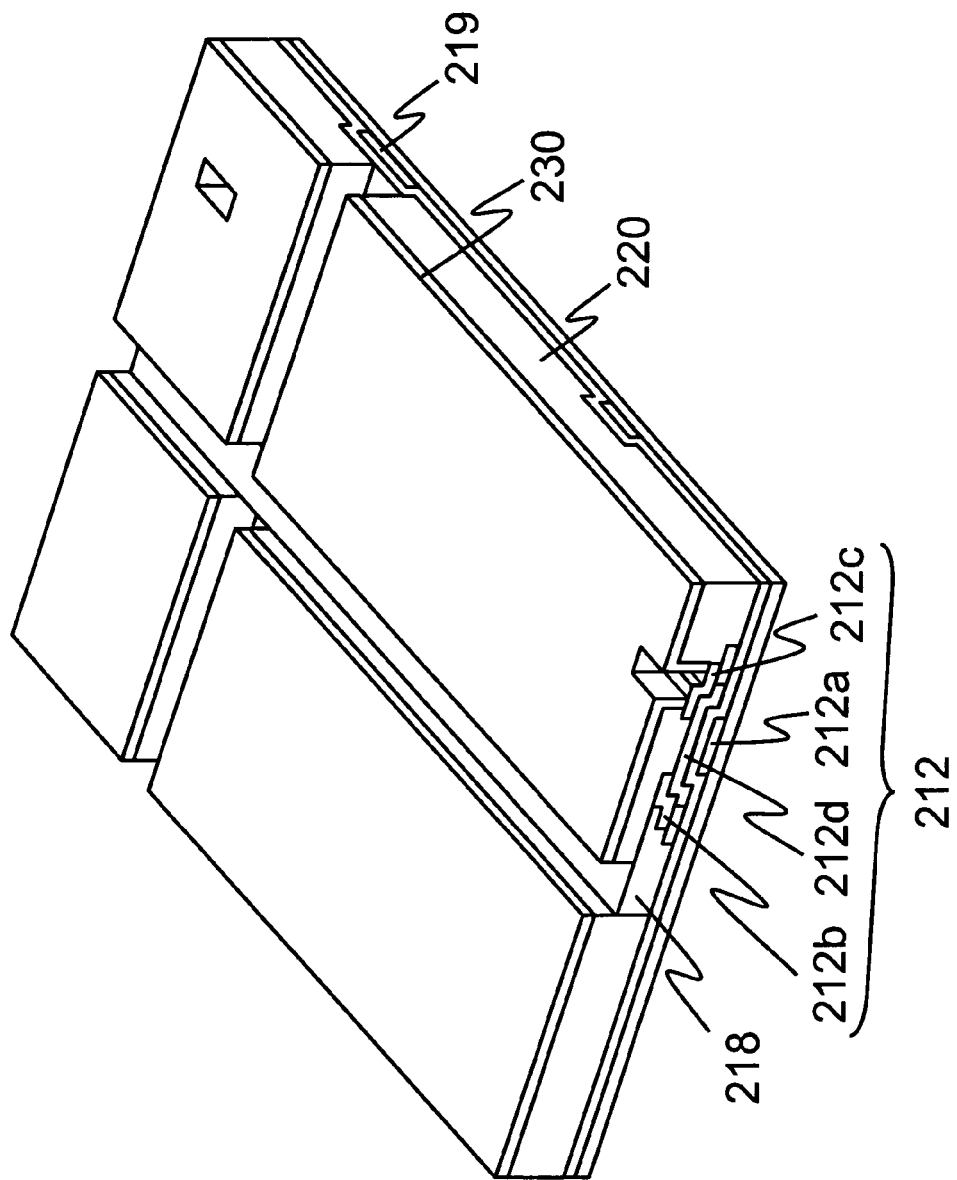
FIG. 5 is an enlarged stereogram of the part A of the active array color filter structure in FIG. 4D.

As shown in FIGS. 3 and 5, the switch element can be a TFT. A gate 212a of the TFT is electrically coupled with the corresponding gate line 219, and a source 212b of the TFT is electrically coupled with the corresponding data line 218. Furthermore, the pixel electrode 230 is electrically coupled to a drain 212c of the TFT through the contact via. Also, the pixel electrode 230 may be extended to cover above a corresponding channel region 212d of the TFT.

The pixel electrode also can directly cover the switch element through the contact via, and be electrically coupled with the switch element. Similarly, an active array substrate 210 is first provided, wherein this active array substrate has a plurality of switch elements 212, as shown in FIG. 4A.

Figure 4B:
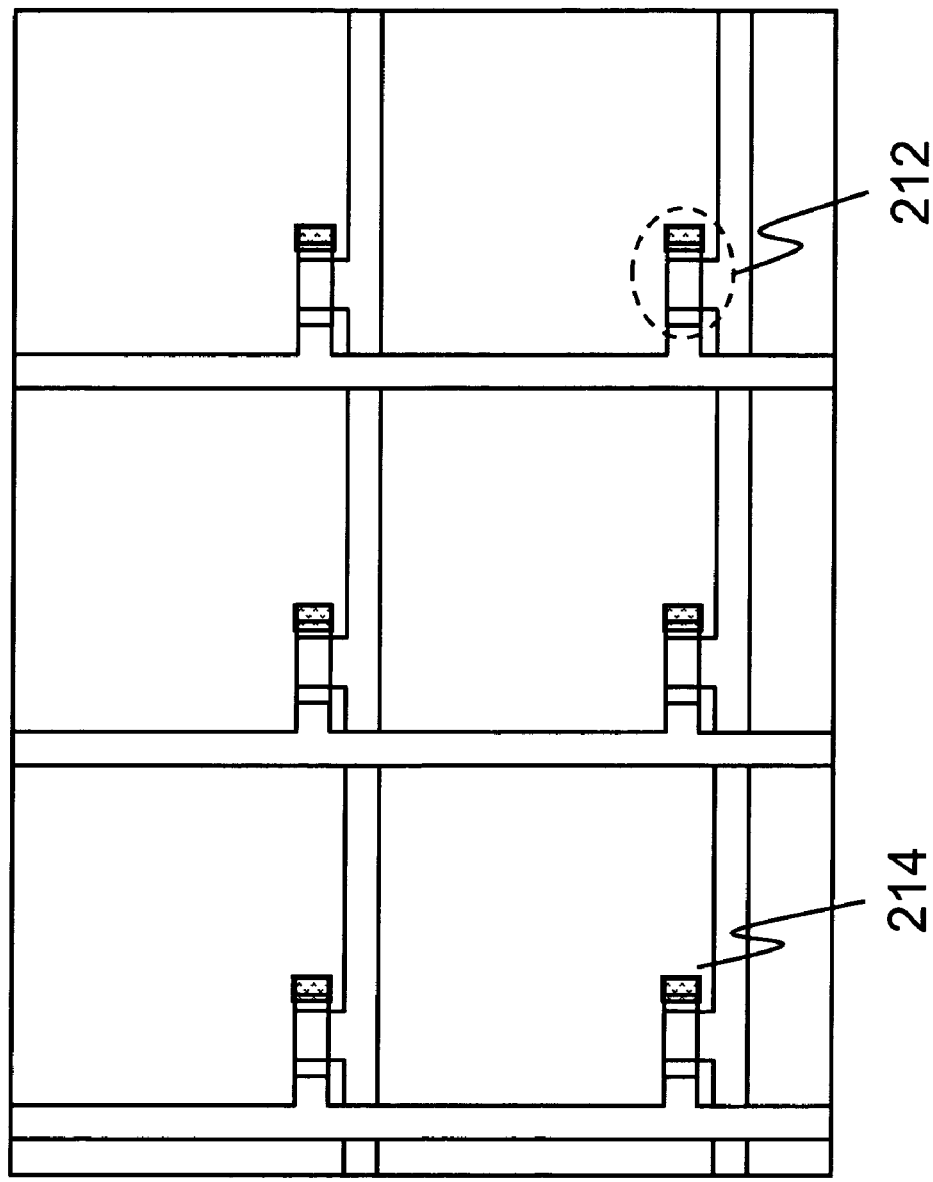

Next, a plurality of lipophobic areas 214 is formed on the active array substrate 210 through a surface treatment, as shown in FIG. 4B. The lipophobic areas 214 are formed on the switch elements 212.

Figure 4C:
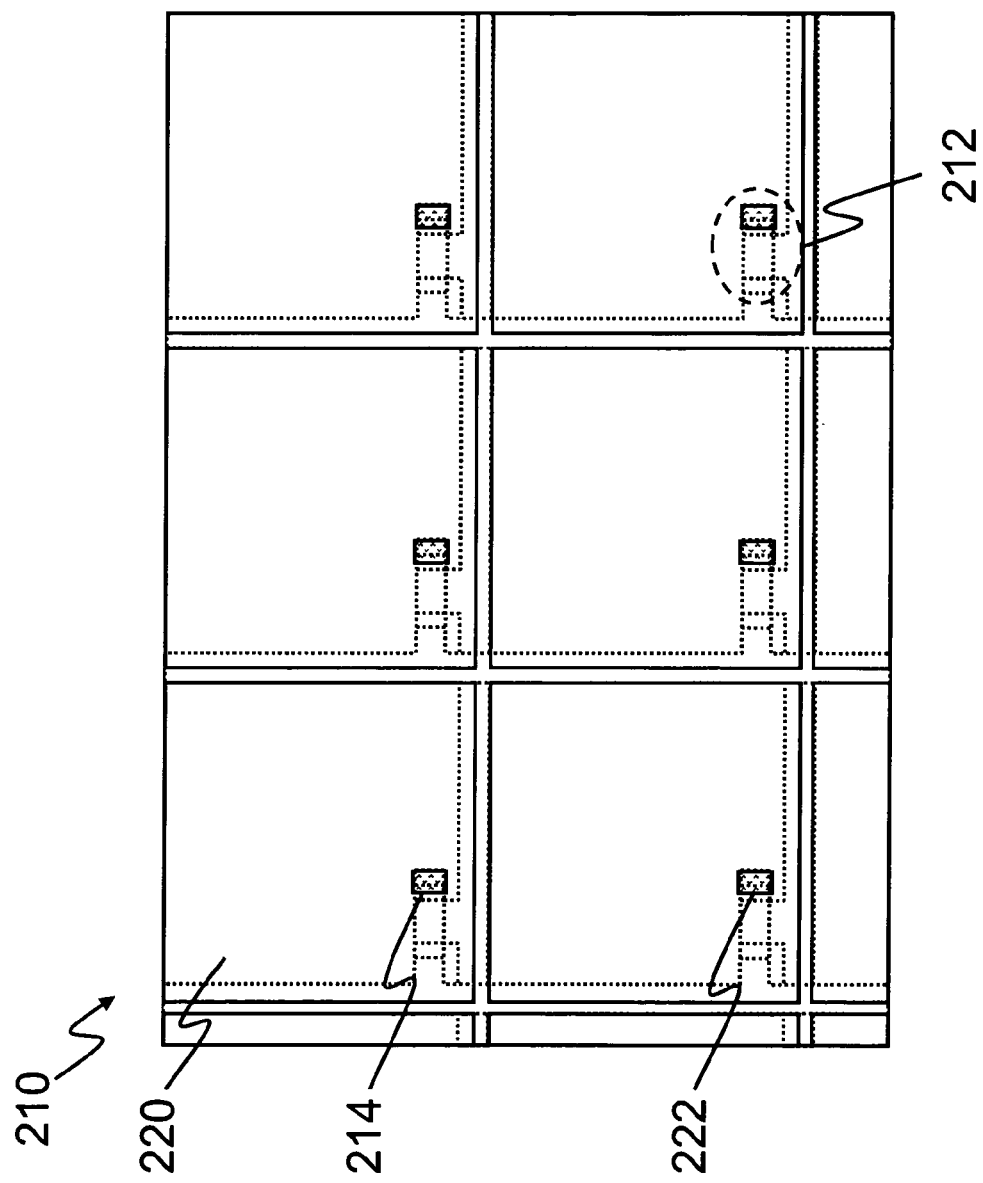

Then, the red, green, and blue inks are coated on the active array substrate 210. The inks on the lipophobic areas 214 are naturally repelled due to the difference between the surface properties of lipophilicity and lipophobicity, so that the color filter pixel 220 with the contact via 222 is formed on the active array substrate 210, as shown in FIG. 4C. The contact via 222 is formed on the lipophobic area 214, that is, the color filter pixel 220 has the contact via 222 on the switch element 212, so as to expose a part of the switch element 212.

Figure 4D:
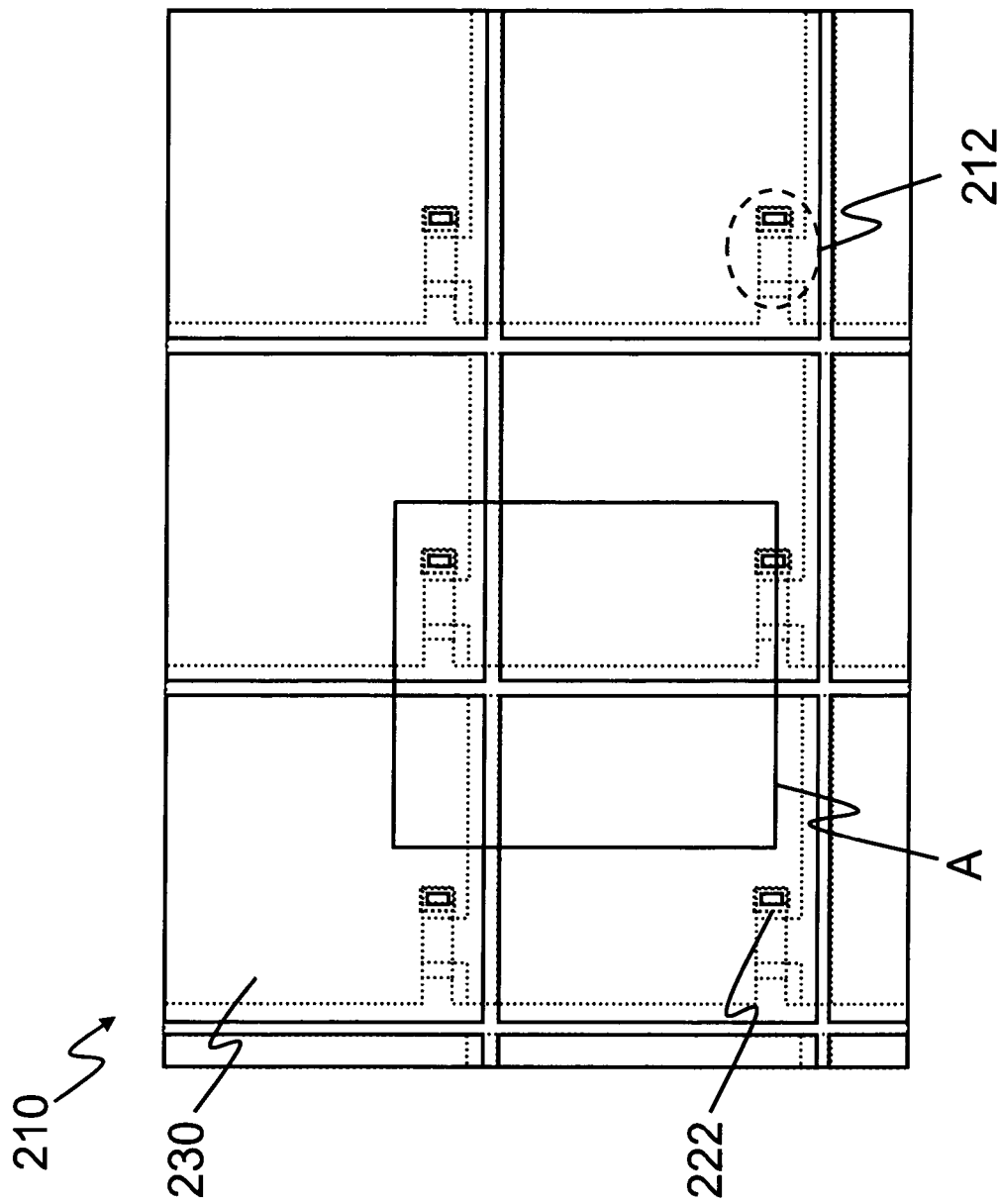

Then, the pixel electrodes 230 are formed on the color filter pixels 220 and electrically coupled with the switch elements 212 below the color filter pixels 220 through the contact vias 222, as shown in FIGS. 4D and 5. In other words, the pixel electrode 230 is extended into the contact via 222, so as to cover the switch element 212 exposed within the contact via 222, thus, the pixel electrode 230 is connected with the switch element 212. The pixel electrode may be extended to partly or completely cover the switch element exposed within the contact via.

Figure 7:
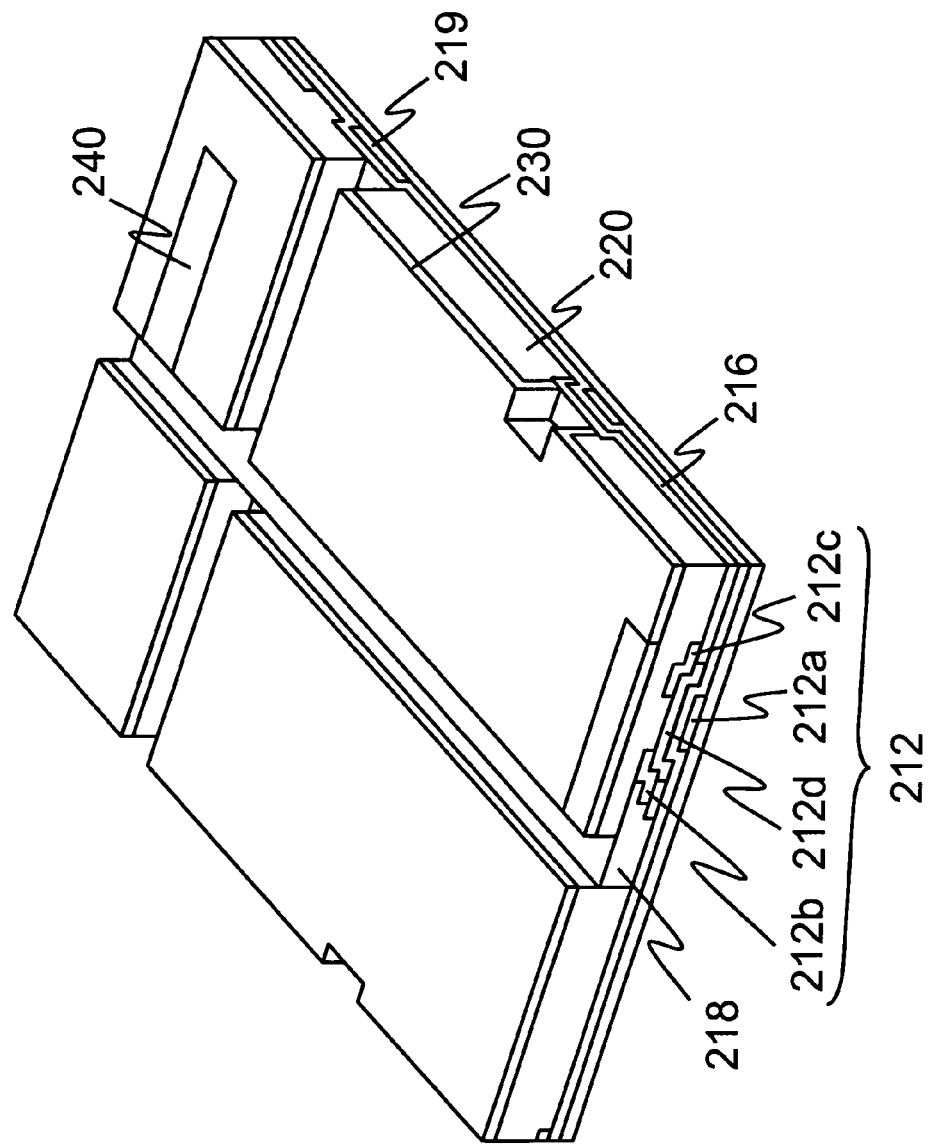
FIG. 7 is a partially enlarged stereogram of an active array color filter structure according to the third embodiment of the present invention.
Figure 8:
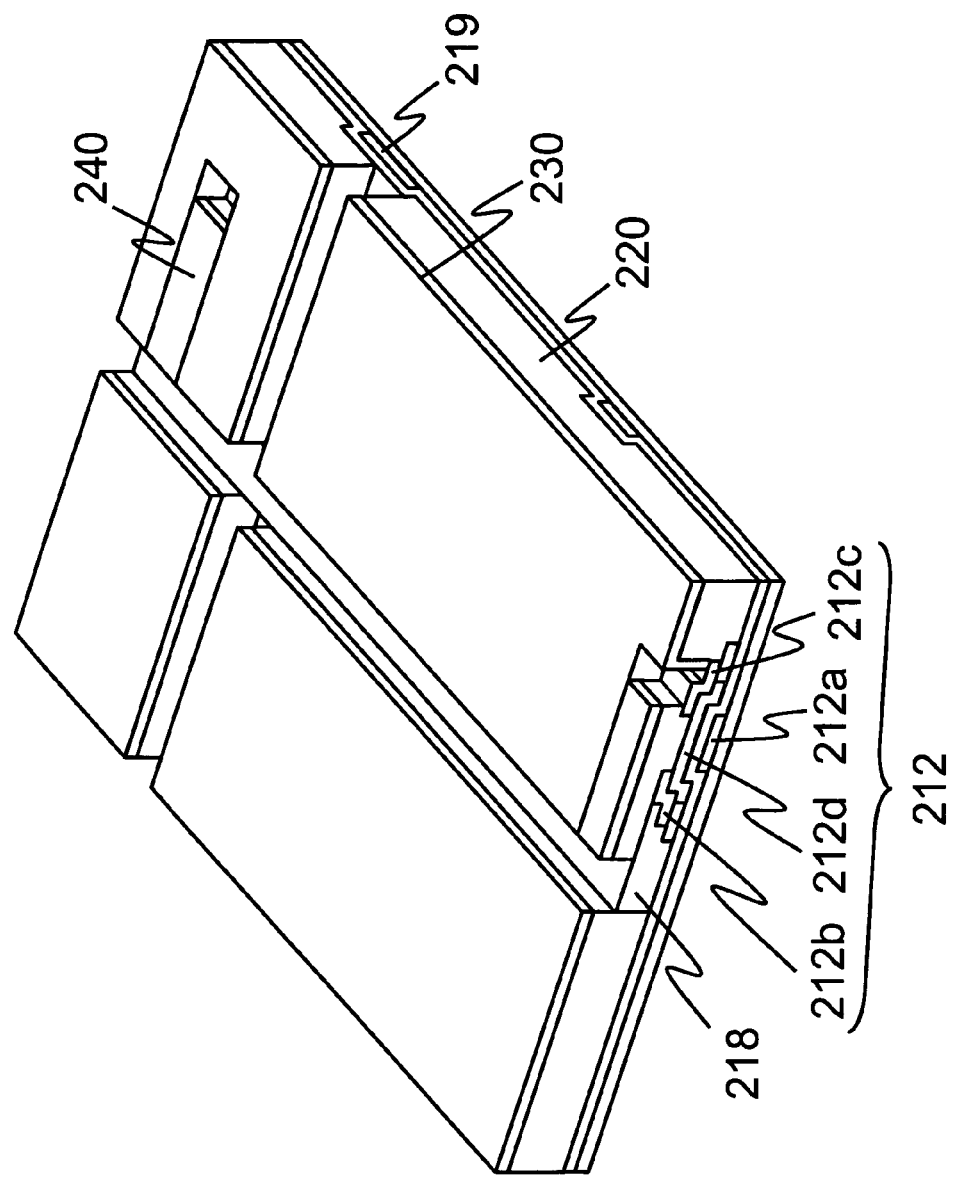
FIG. 8 is a partially enlarged stereogram of an active array color filter structure according to the fourth embodiment of the present invention.

In addition, the pixel electrode 230 may not be extended to cover above the switch element 212, but form a conductive electrode 240 on the color filter pixel 220 relative to the switch element 212, after the pixel electrode 230 has been formed, as shown in FIGS. 7 and 8. The conductive electrode may be extended to partly or completely cover the switch element. Thus, the aggravation of the switch element will be reduced, so as to elongate the lifetime of the substrate, improve product reliability, and achieve a high-quality displaying effect.

Figure 9:
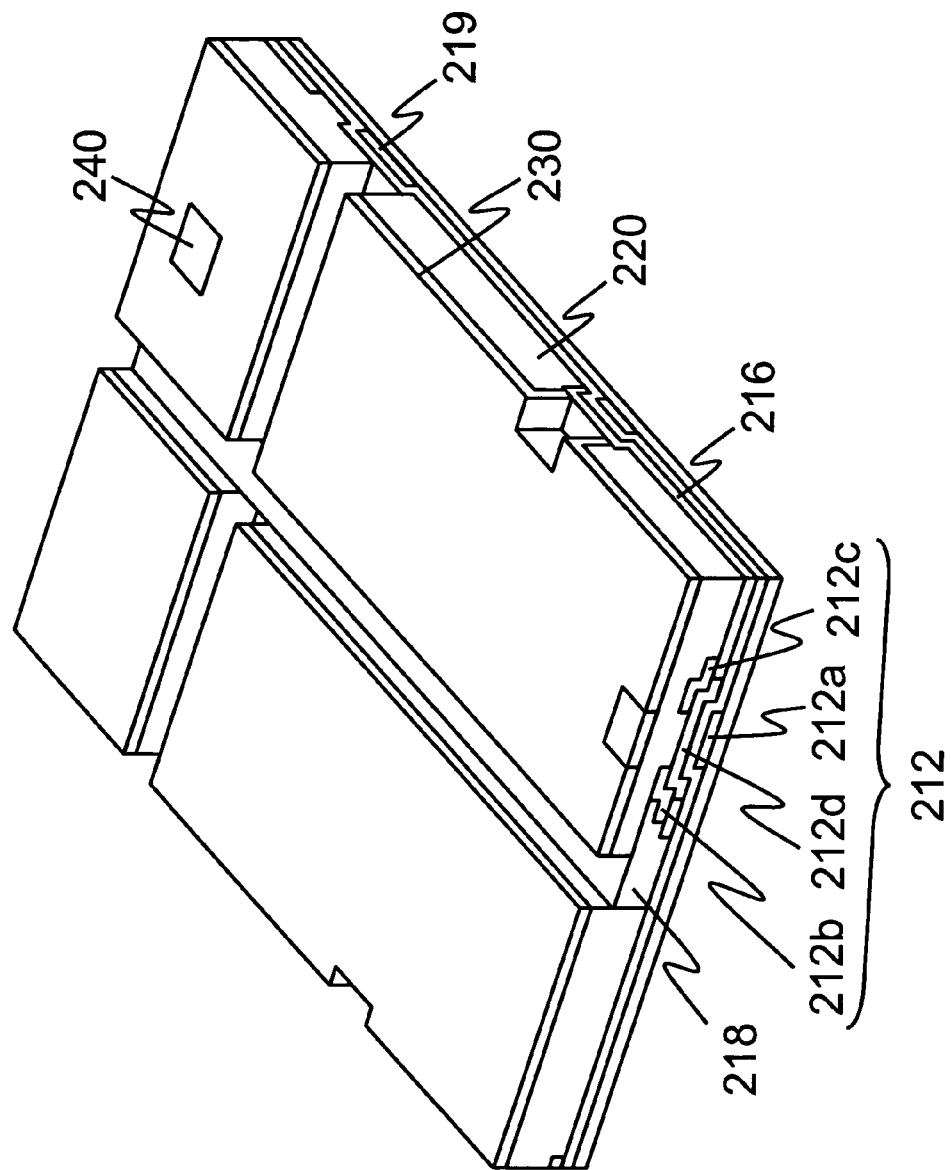
FIG. 9 is a partially enlarged stereogram of an active array color filter structure according to the fifth embodiment of the present invention.
Figure 10:
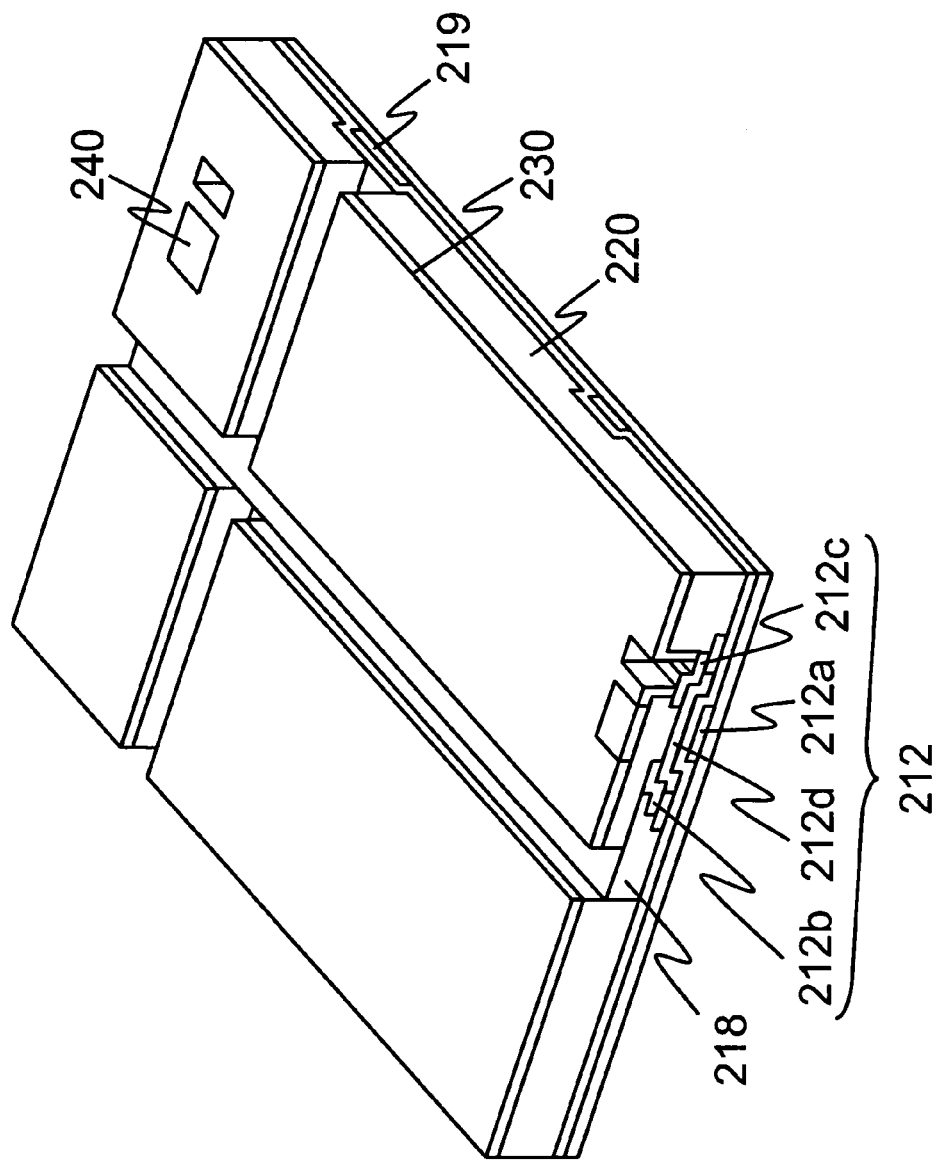
FIG. 10 is a partially enlarged stereogram of an active array color filter structure according to the sixth embodiment of the present invention.

When the switch element 212 is a TFT, the conductive electrode 240 may cover above the channel region 212d of the TFT, as shown in FIGS. 9 and 10. Thus, abnormal phenomena of the TFT are postponed, thereby reducing the aggravation of the switch element, elongating the lifetime of the substrate, improving product reliability, and achieving a high-quality displaying effect. In addition, the conductive electrode may have the same potential as the corresponding drain of the TFT.

The material of the conductive electrode can be a transparent conductive material (metal oxide, such as indium tin oxide (ITO)), or a light-shading conductive material (such as an opaque conductive particle paste or a metal thin film). When the material of the conductive electrode is a light-shading conductive material, the conductive electrode is used to prevent the light leakage of the TFT, to replace the black matrix with the function of preventing light leakage.

Figure 11:
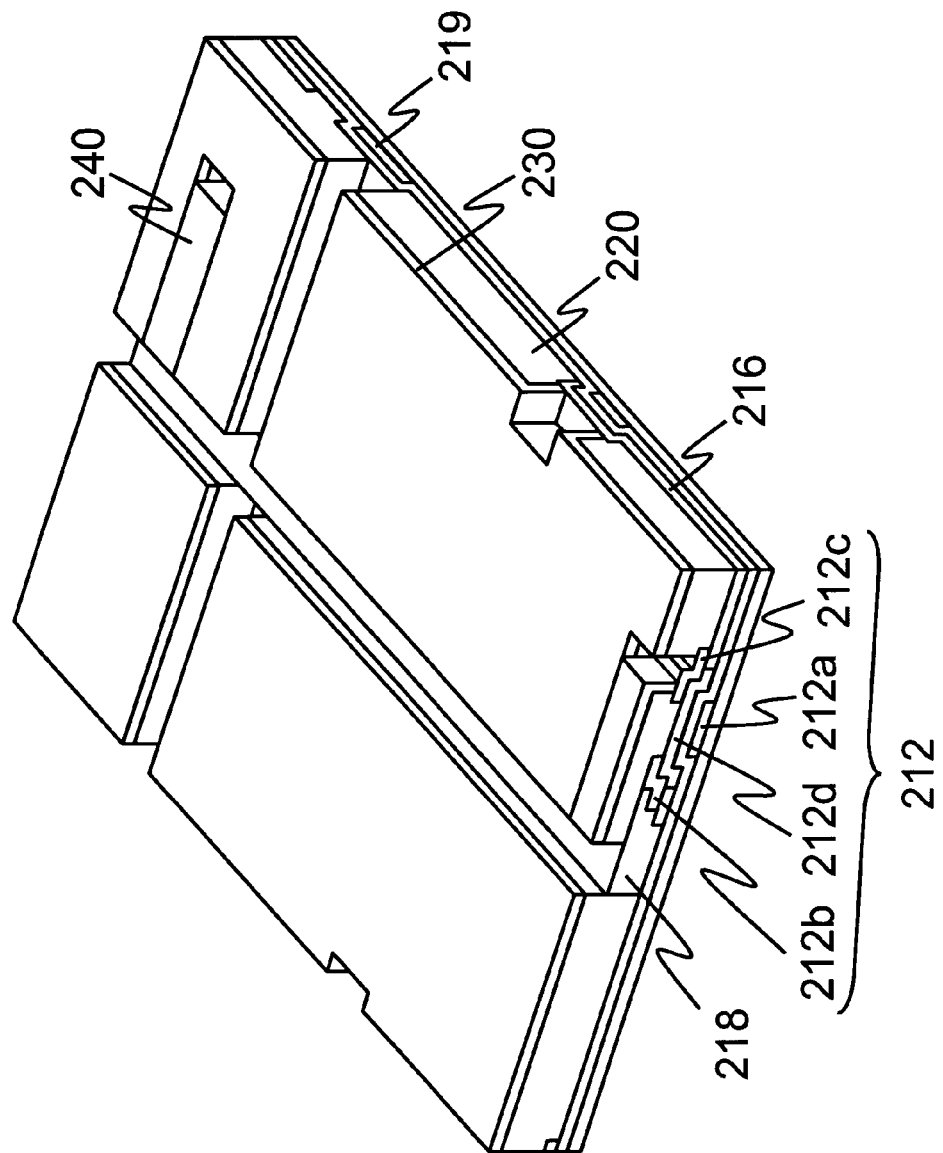
FIG. 11 is a partially enlarged stereogram of an active array color filter structure according to the seventh embodiment of the present invention.
Figure 12:
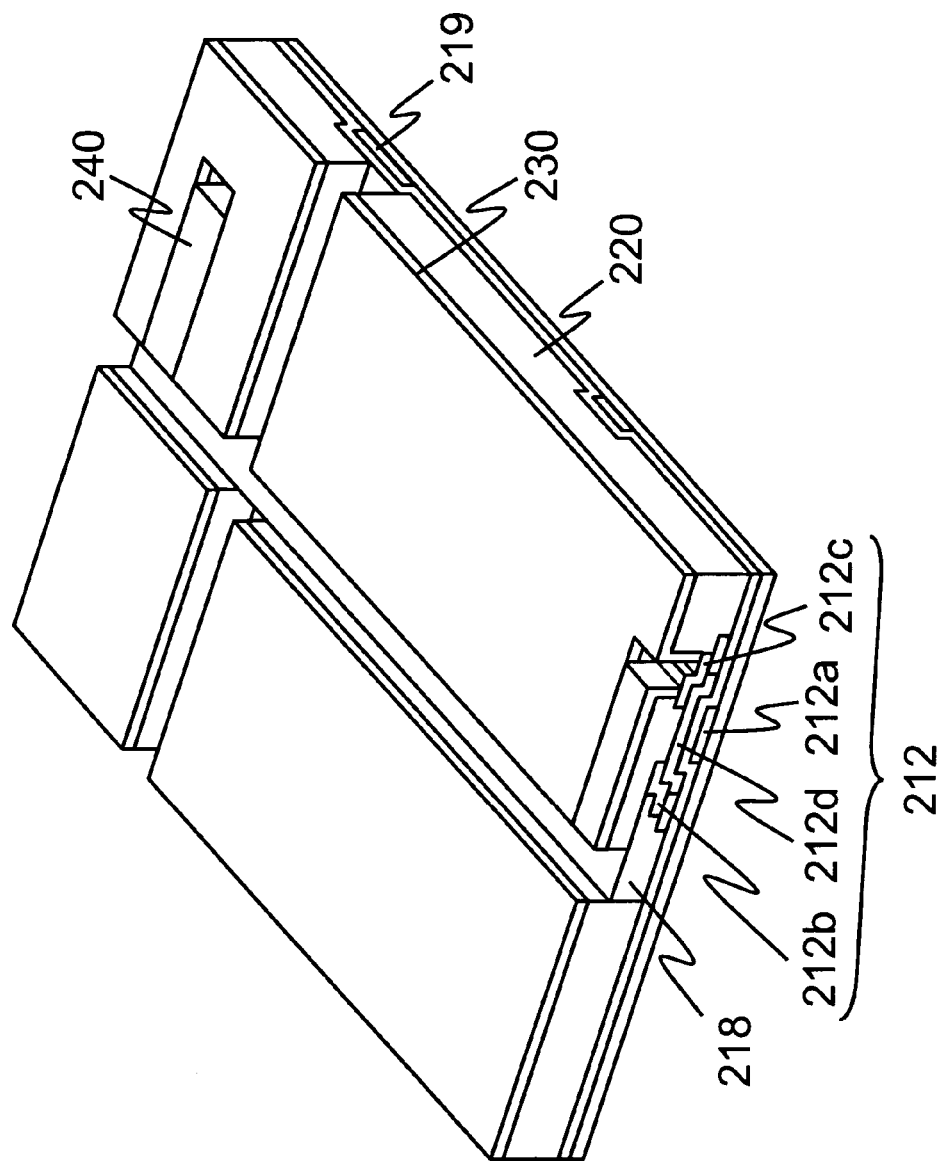
FIG. 12 is a partially enlarged stereogram of an active array color filter structure according to the eighth embodiment of the present invention.
Figure 13:
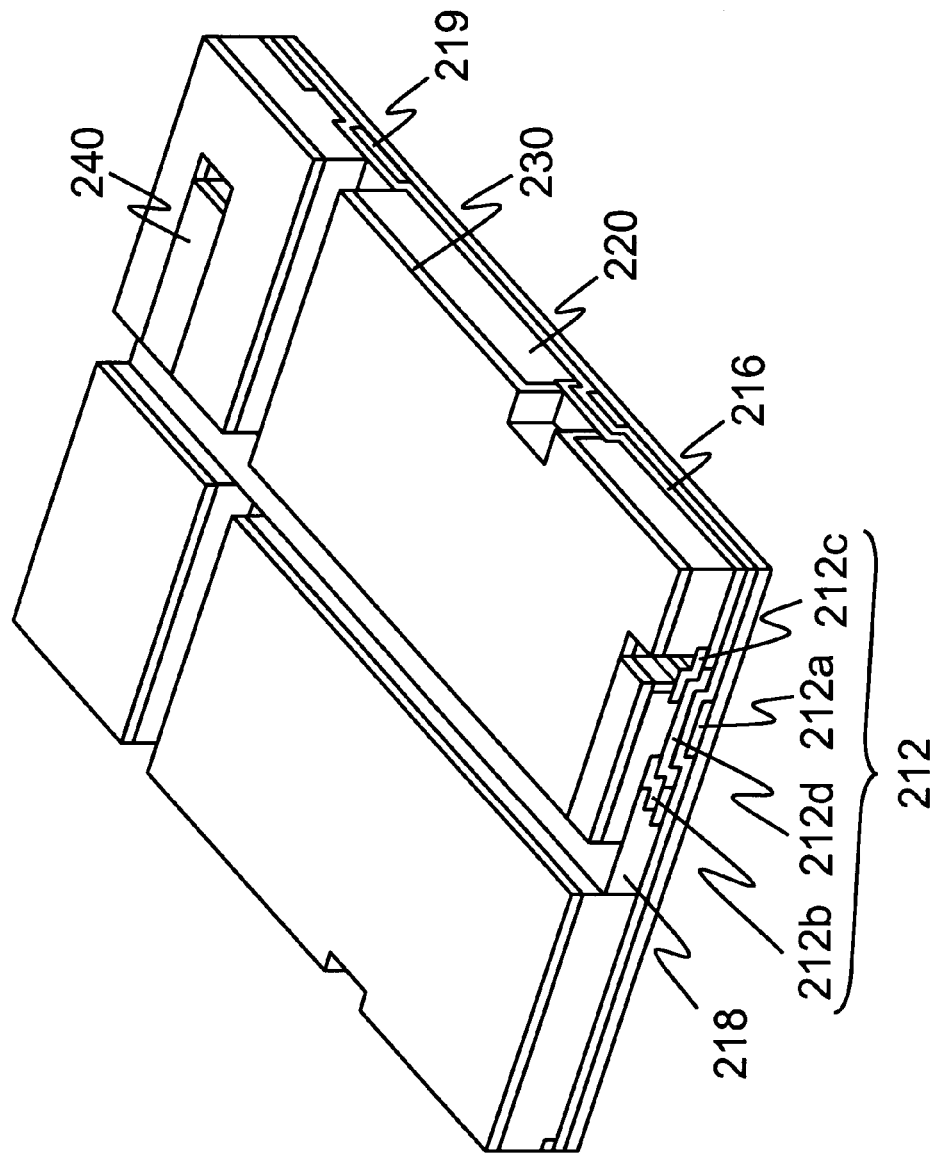
FIG. 13 is a partially enlarged stereogram of an active array color filter structure according to the ninth embodiment of the present invention.
Figure 14:
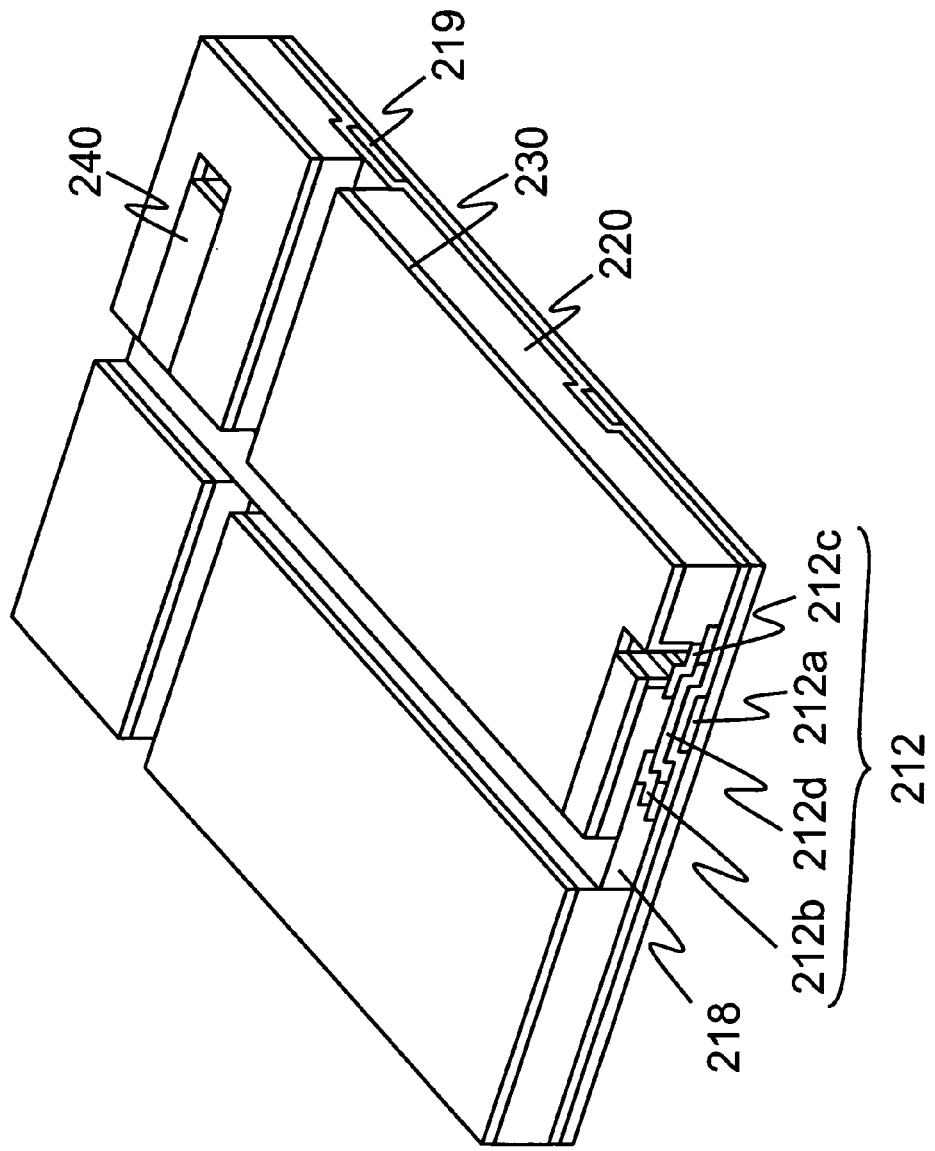
FIG. 14 is a partially enlarged stereogram of an active array color filter structure according to the tenth embodiment of the present invention.

Furthermore, the conductive electrode 240 also can be electrically coupled with the corresponding switch element 212 through the contact via (shown in FIGS. 11 and 12), or floated to the corresponding switch element 212 through the contact via (shown in FIGS. 13 and 14). When the switch element is a TFT, the conductive electrode will be electrically coupled with the corresponding drain or source of the TFT, or in a floating state.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for fabricating an active array color filter structure, comprising the steps of:
   a. providing an active array substrate having a plurality of switch elements arranged into a matrix;
   b. performing a surface treatment on the active array substrate to form a plurality of lipophobic areas thereon which repel ink;
   c. coating at least one ink on a surface of the active array substrate which includes the plurality of lipophobic areas, to form a plurality of color filter pixels;
   d. forming at least one contact via corresponding to respective ones of the plurality of lipophobic areas within each of the plurality of color filter pixels and through the respective ones of the plurality of lipophobic areas which repel the at least one ink; and e. forming a plurality of pixel electrodes, one each on respective ones of the plurality of color filter pixels with respective ones of the at least one contact via, wherein each pixel electrode of the plurality of pixel electrodes is electrically coupled with a corresponding switch element through a corresponding contact via, respectively.

2. The method for fabricating an active array color filter structure as claimed in claim 1, further comprising the step of:
forming a plurality of conductive electrodes on respective color filter pixels corresponding to respective switch elements.

3. The method for fabricating an active array color filter structure as claimed in claim 2, wherein the plurality of conductive electrodes is composed of a material that is a transparent conductive material or a light-shading conductive material.

4. The method for fabricating an active array color filter structure as claimed in claim 2, wherein each switch element of the plurality of switch elements is a thin film transistor (TFT) having a channel region, and one conductive electrode of the plurality of conductive electrodes covers the corresponding channel region of the TFT.

5. The method for fabricating an active array color filter structure as claimed in claim 2, wherein each conductive electrode of the plurality of conductive electrodes is electrically coupled with or floated to one corresponding switch element through a respective contact via.

6. The method for fabricating an active array color filter structure as claimed in claim 2, wherein each conductive electrode of the plurality of conductive electrodes is not electrically coupled with one corresponding switch element.

7. The method for fabricating an active array color filter structure as claimed in claim 1, wherein, in the step of forming a plurality of pixel electrodes on respective ones of the plurality of color filter pixels, each pixel electrode is extended to cover above one corresponding switch element.

8. The method for fabricating an active array color filter structure as claimed in claim 1, wherein the step of providing an active array substrate comprises the steps of:
providing a substrate;
forming a plurality of parallel gate lines and a plurality of parallel signal lines perpendicular to the gate lines on the substrate, so that a region is defined between any two adjacent gate lines and any two adjacent data lines that is a pixel region; and
forming the respective switch elements on the substrate near the intersections of the gate lines and the data lines, to obtain the active array substrate.

9. The method for fabricating an active array color filter structure as claimed in claim 8, wherein each switch element of the plurality of switch elements is a thin film transistor (TFT) having a gate and a source; the gate of each respective TFT is electrically coupled with a corresponding gate line; and the source of each respective TFT is electrically coupled with a corresponding data line.

10. The method for fabricating an active array color filter structure as claimed in claim 8, wherein each respective color filter pixel is overlapped with a respective pixel region.

11. The method for fabricating an active array color filter structure as claimed in claim 1, wherein, in the step of forming a plurality of pixel electrodes, one each on respective ones of the plurality of color filter pixels, each respective pixel electrode is extended to cover above a corresponding switch element.

12. The method for fabricating an active array color filter structure as claimed in claim 1, wherein the step of performing a surface treatment to form a plurality of lipophobic areas includes coating a lipophobic material at respective positions on the active array substrate where a plurality of contact vias are to be formed, so as to form the plurality of lipophobic areas.

13. The method for fabricating an active array color filter structure as claimed in claim 1, wherein the step of performing a surface treatment to form a plurality of lipophobic areas on the active array includes pressing lipophobic material at respective positions on the active array substrate where a plurality of contact vias are to be formed, so as to form the plurality of lipophobic areas.

14. A method for fabricating an active array color filter structure, comprising the steps of:
a. providing an active array substrate having a plurality of switch elements arranged into a matrix;
b. performing a surface treatment to form a plurality of lipophobic areas on the active array substrate by coating a lipophobic material at respective positions on the active array substrate where a plurality of contact vias are to be formed, so as to form the plurality of lipophobic areas;
c. coating at least one ink on the active array substrate to form a plurality of color filter pixels, so that each color filter pixel of the plurality of color filter pixels has at least one contact via corresponding to one lipophobic area respectively; and
d. forming a plurality of pixel electrodes on the plurality of color filter pixels so that each pixel electrode of the plurality of pixel electrodes is electrically coupled with a corresponding switch element through a corresponding at least one contact via, respectively.

15. The method for fabricating an active array color filter structure as claimed in claim 14, further comprising the step of:
removing the lipophobic material before the plurality of pixel electrodes are formed.

16. The method for fabricating an active array color filter structure as claimed in claim 14, wherein coating a lipophobic material at respective positions on the active array substrate is accomplished by an ink jet technique.

17. The method for fabricating an active array color filter structure as claimed in claim 14, wherein, after coating a lipophobic material at respective positions on the active array substrate, the method further comprises the step of:
applying a plasma treatment to the active array substrate where the plurality of contact vias are to be formed, so as to form the plurality of lipophobic areas.

18. A method for fabricating an active array color filter structure, comprising the steps of:
a. providing an active array substrate having a plurality of switch elements arranged into a matrix;
b. performing a surface treatment to form a plurality of lipophobic areas on the active array substrate by pressing a lipophobic material at respective positions on the active array substrate where a plurality of contact vias are to be formed, so as to form the plurality of lipophobic areas;
c. coating at least one ink on the active array substrate to form a plurality of color filter pixels, so that each color filter pixel of the plurality of color filter pixels has at least one contact via corresponding to one lipophobic area, respectively; and
d. forming a plurality of pixel electrodes on the plurality of color filter pixels, so that each pixel electrode of the plurality of pixel electrodes is electrically coupled with a corresponding switch element through a corresponding at least one contact via, respectively.

19. The method for fabricating an active array color filter structure as claimed in claim 18, further comprising the step of:

removing the lipophobic material before the plurality of pixel electrodes are formed.

20. The method for fabricating an active array color filter structure as claimed in claim 18, wherein, after pressing a lipophobic material at respective positions on the active array substrate, the method further comprises the step of:

applying a plasma treatment to the active array substrate where the plurality of contact vias are to be formed, so as to form the plurality of lipophobic areas.

* * * * *